June 29, 1937.  G. H. HOLLOWAY  2,085,157
MACHINE FOR MAKING BUTTER ROLLS
Filed June 8, 1936  2 Sheets-Sheet 2
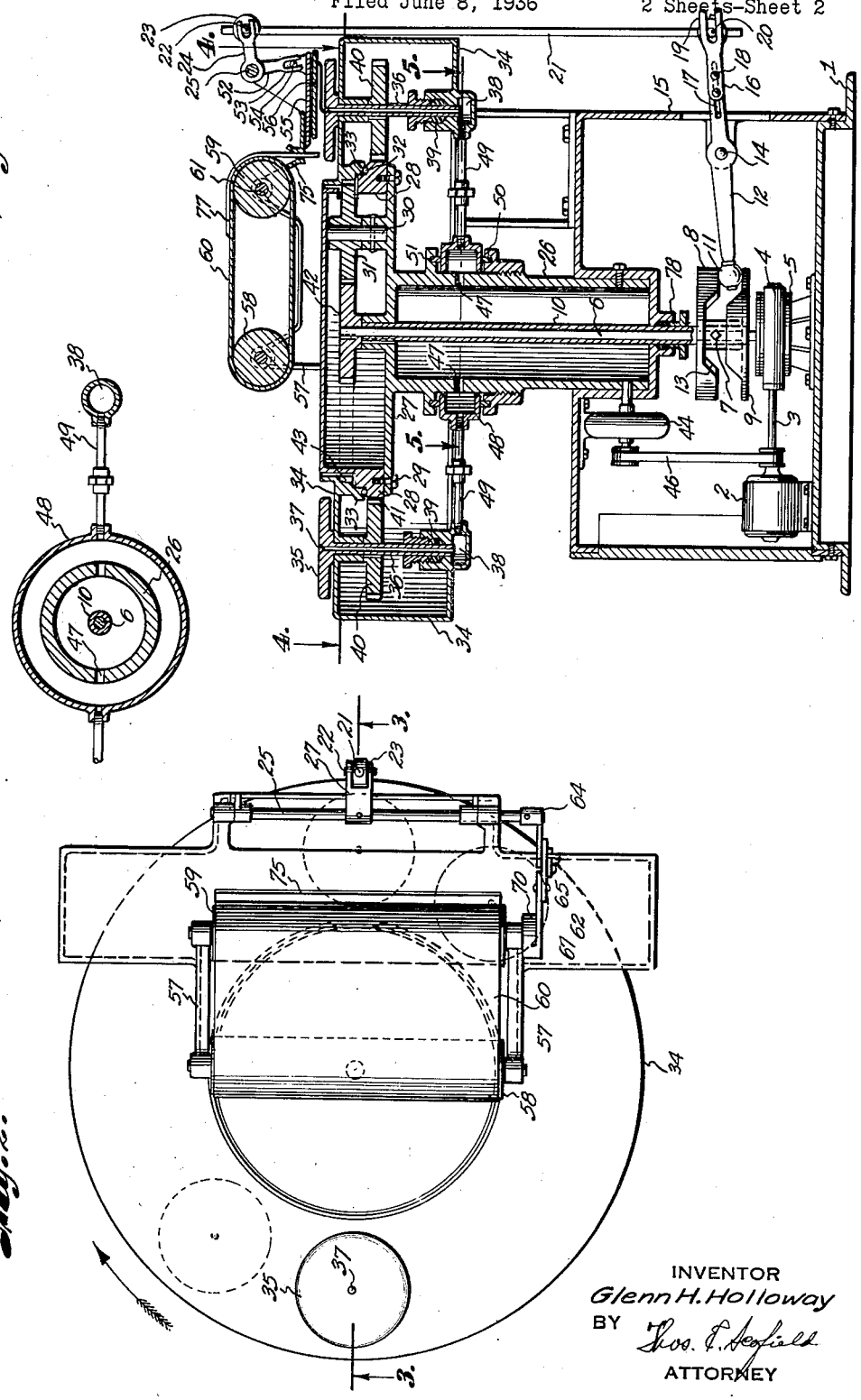
INVENTOR
Glenn H. Holloway
BY
ATTORNEY Patented June 29, 1937

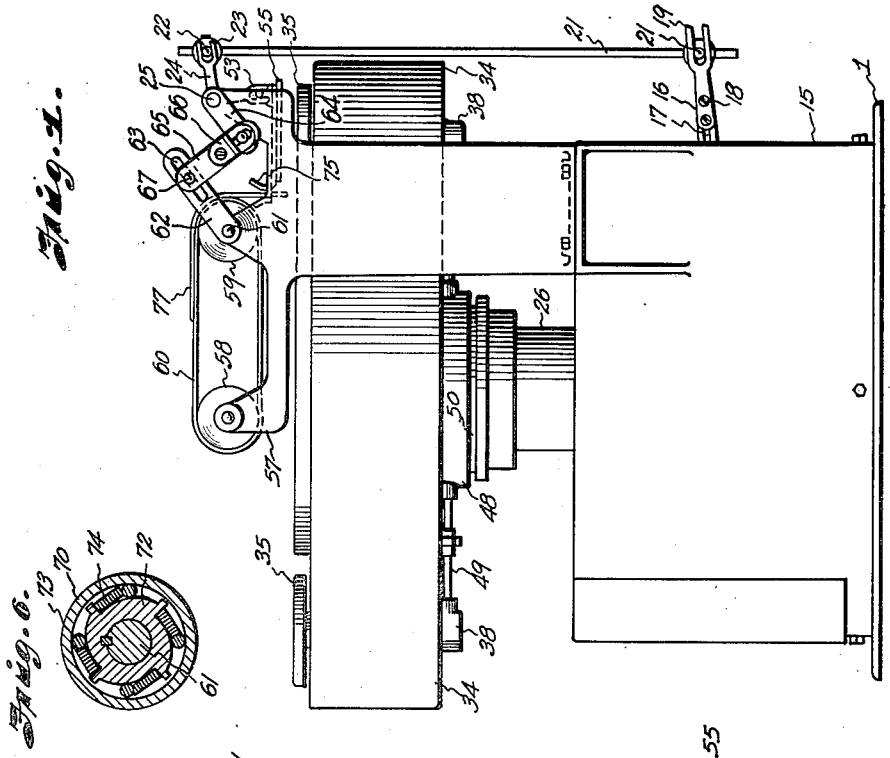

2,085,157

UNITED STATES PATENT OFFICE 2,085,157

MACHINE FOR MAKING BUTTER ROLLS

Glenn H. Holloway, Kansas City, Mo.

Application June 8, 1936, Serial No. 84,054

8 Claims. (Cl. 107—9)

My invention relates to a machine for making butter rolls, and more particularly to a machine for making twisted rolls and pastries.

By "butter rolls" I mean a roll made of a short dough which is twisted spirally to form a flat disk-like shape and then baked. As now made, after the dough has been mixed and allowed to rise, it is rolled fairly flat and cut into a plurality of elongated strips. These strips are rolled by hand into flat spirals to form Flemish coils. These coils are subsequently baked to form the finished rolls. The operation of coiling the rolls is a tedious one.

One object of my invention is to provide a machine for forming strips of dough and coiling them into Flemish coils for the confection of butter rolls or pastries having similar form.

Another object of my invention is to provide a machine in which the thickness of the roll may be readily controlled.

Other and further objects of my invention will appear from the following description.

In the accompanying drawings which form part of the instant specification and are to be read in conjunction therewith and in which like reference numerals are used to indicate like parts in the various views;

Figure 1 is a side elevation of a machine containing one embodiment of my invention.

Figure 2 is a plan view of the machine shown in Figure 1.

Figure 3 is a sectional view taken on a line 3—3 of Figure 2.

Figure 4 is a sectional view taken on a line 4—4 of Figure 3.

Figure 5 is a sectional view taken on a line 5—5 of Figure 3.

Figure 6 is a sectional detail view of an overrunning clutch used in my machine.

Figure 7 is a plan view of the cutting blade used in my machine.

In general, my invention contemplates the use of a feeding device for feeding a sheet of dough to a cutting device which cuts the sheet successively into strips which are adapted to fall upon a turntable carried by a rotating table. The turntable is adapted to form a Flemish coil of the strip. The finished coil is removed from the turntable by hand.

More particularly referring now to the drawings, mounted on a suitable pedestal 1 is an electric motor 2, the shaft 3 of which is adapted to rotate a worm housed within housing 4. The worm engages a helical gear within housing 5. The helical gear is keyed to a shaft 6. Secured to shaft 6 by means of a set screw 7 is a cam formed by upper portion 8 and lower portion 9. The shaft 6 rotates within a suitable bushing 10. A follower 11 provided at the end of a lever 12 is actuated by the cam track 13, formed by upper member 8 and lower member 9. Lever 12 is pivoted at 14 and has an arm 16 extending outside of a casing 15 which is mounted upon the pedestal 1. The arm 16 is adjustable in length as can readily be seen by reference to Figures 1 and 3. In the drawings, the arm is made of two parts, one of which is slotted at 17 and adjustment made by means of adjusting screws 18. The outer end of arm 16 terminates in a double fork 19 in which a cross pin 20 rests. Secured to cross pin 20 for actuation thereby is a connecting rod 21 which is connected at its upper end to a cross pin 22 which rides in a bifurcated fork 23 at the end of a lever 24. The lever 24 is keyed to shaft 25.

Supported on casing 15 is a hollow pedestal 26 which carries at its upper end a flange 27 to which is secured a member 28 by means of stud bolts 29. The stub shaft 30 is secured in the flange 27 to form a pivot for a gear wheel 31. A bearing track 32 is formed in the member 28, on which, through ball or roller bearings 33, a rotating member 34 is supported. Rotatably mounted upon rotating member 34 are a plurality of turntables 35 on which the Flemish coils of dough are actually formed. The turntables 35 terminate in hollow shafts 36 provided with bores 37 which extend into chambers 38 through suitable stuffing boxes 39. Keyed to shafts 36 are gears 40. Gear teeth 41 are formed in member 28 with which gears 40 engage. To the upper end of shaft 6 is keyed a driving gear 42 which is in mesh with the teeth of gear 31. Gear teeth 43 are formed in rotary member 34 with which teeth the teeth of gear 31 also mesh. Suitably supported within casing 15 is a vacuum pump 44 driven through a belt or the like 46 from motor 2. The vacuum pump takes suction from the interior of hollow pedestal 26. Hollow pedestal 26 is provided with a plurality of openings 47 which communicate with a channel member 48. Channel member 48 communicates with chambers 38 through pipes 49. Suitable packing rings 50 and 51 are provided upon pedestal 26 to seal the annular channel member 48.

Keyed to shaft 25 is a lever 52 which terminates in a bifurcated fork 53 which is adapted to embrace driving pin 54 secured to reciprocating knife 55 which is mounted for reciprocation upon any suitable bearings as for example plate 56. Suitably mounted above the rotary member 35 as for example on bracket 57 are a pair of rollers 58 and 59 over which is stretched a conveyor belt 60. Roller 59 is keyed to shaft 61. A crank 62 is secured to the casing 70 of the overrunning clutch, one member 72 of which is keyed to shaft 61. The overrunning clutch may be of any suitable type, as for example that shown in Figure 6 in which rollers 73 are urged in a clockwise direction by a plurality of springs 74. Rotation of the casing 70 in a clockwise direction will jam the rollers 73 between clutch member 72 and the casing, forcing the member 72 to rotate. Rotation of the casing in a counterclockwise direction will permit the casing to turn freely since the rollers will tend to roll out of wedging engagement against the action of springs 74. Crank 62 is provided with a slot 63. A crank 64 is keyed to shaft 25 and is connected by any suitable linkage, as for example, link 65, to crank 62. Link 65 is provided with means 66 for varying its length. The point of connection between link 65 and crank 62 may be varied anywhere in slot 63 by means of adjustable connecting means 67. Guide member 75 is provided below roller 59.

The knife 55 is provided with an edge 76, which is tapered.

In operation a sheet of dough 77 is rolled and placed upon the conveyor belt 60. The motor 2 is started to rotate shaft 3 to rotate the worm to drive the helical gear which is keyed to shaft 6, thus rotating shaft 6. The rotation of shaft 6 will rotate gear 42 which is keyed thereto. Gear 42 engages idler gear 31 which in turn engages the gear teeth 43 formed upon rotating member 34. The rotating member 34 will then rotate in a clockwise direction as shown by the arrow in Figure 2. The turntables 35 and gears 40 will be carried around in a clockwise direction. Gears 40 mesh with stationary gear teeth 41 which are formed upon the member 28 secured to the flange 27. The moving of the turntables in a clockwise direction will cause them to turn in a clockwise direction due to the meshing of gears 40 with the stationary gear teeth 41. It will be apparent that the turntables 35 will be carried around clockwise and will be rotating. The cam, as will be readily seen by reference to Figure 3 is formed to alternately raise and depress the follower 11 at intervals determined by the cam. A depression of the follower will result in an elevation of the arm 16 and hence of connecting rod 21. An elevation of connecting rod 21 will result in the rotation of shaft 25 in a counterclockwise direction through the crank lever 24 which is keyed to shaft 25. An upward motion of rod 21 will result in the movement of knife 55 to the right as viewed in Figure 3, due to the keying of crank lever 52 to shaft 25. The counterclockwise rotation of shaft 25 will also move the lower end of crank 64 to the right, pulling crank 62 to the right, as viewed in Figure 1 through the agency of link 65. The rotation of crank 62 to the right will move the shell 70 of the overrunning clutch to the right and cause shaft 61 to rotate in a clockwise direction, moving the upper side of conveyor belt 60 to the right and feeding the sheet of dough. The amount of feed can be easily regulated by the position of connection of link 65 to crank 62 by means of the slot 63 and adjustable means 67. Continued rotation of the cam will then move the rod 21 downwardly through the lever 12. Downward movement of connecting rod 21 will cause a clockwise rotation of shaft 25. This will cause the crank lever 52 to move the reciprocating knife 55 to the left. The clockwise rotation of shaft 25 will move the crank 62 to the left, permitting the overrunning clutch to overrun. As the knife moves outwardly to the left, the extreme right hand side of the knife, as viewed in Figure 7 will first engage the sheet of dough. As the knife progressively moves along the dough, a strip of dough will be formed. In the meantime, the rotating member 34 is moving and the synchronism is such that, as the knife has moved out sufficiently to cut that length of dough required to reach from the knife to the table, the latter will be directly under the hanging end of the strip of dough being formed.

It will be noted that the vacuum pump 44 has created a reduced pressure within the hollow pedestal 26 which, in turn, communicates with channel member 48. The channel member 48 and pipes 49 are secured to the rotating member 34 and rotate with it. A stuffing box 78 prevents the reduced pressure from being dissipated where the shaft 6 and bushing 10 enters the hollow pedestal 26. The packing rings 50 and 51 prevent the vacuum from being dissipated from the connection between rotating channel 48 and the flanges formed upon the pedestal 26. The reduced pressure is such that air tends to flow from the atmosphere downwardly through the bores 37 of turntable shaft 36 into chambers 38, through pipes 49, through channel member 48, through openings 47 into hollow pedestal 26 and thence to the suction of vacuum pump 44. The reduced pressure thus formed tends to permit atmospheric pressure to hold the end of the strip of dough being formed by the knife upon the turntable 35 at or near the center thereof. As the knife cuts, the turntable is carried by rotating member 34 and is also rotated to form a Flemish coil of the strip of dough being cut by the knife. As the coil is carried around toward the side of the machine, an operator slides the coil of dough from the turntable 35 onto any suitable surface. The coils of dough may then be placed upon a conveyor belt for further processing.

It is believed the operation of my device will be clear from the foregoing description. For simplicity's sake, I have shown only two turntables and a cam track for operating the knife and feed in synchronism with two turntables. The connecting rod 21 must move once upwardly and once downwardly for each turntable in synchronism. The throw of the knife can be readily regulated by means of lengthening or shortening the arm 16 of lever 12.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a butter roll machine, a rotating member, means for rotating said rotating member, a turntable carried by said rotating member, means actuated by the rotating member for revolving said turntable, a conveyor adapted to feed a sheet of dough, a cutting member for cutting said sheet of dough into strips, said cutting member having a portion thereof positioned over the path of said turntable, means synchronized with said rotating member for actuating said conveyor, means synchronized with said rotating member for actuating said cutting member, the timing of said cutting member being such that an end of a strip of dough being formed will be deposited upon the turntable, and means for holding the end of a strip of dough upon said turntable.

2. A butter roll machine, as in claim 1 wherein said means for holding the end of a strip of dough upon said turntable comprises a duct terminating upon the surface of said turntable and means for creating a reduced pressure within said duct.

3. In a butter roll machine a moving platform, a cutting means, a turntable mounted upon said moving platform and adapted to be carried thereby beneath a portion of said cutting means, means for imparting a rotating movement to said turntable while it is being carried along by said moving platform, means for feeding a sheet of dough to said cutting means, said cutting means being synchronized with the motion of said moving platform such that said cutting means will be operated to form a strip of dough the end of which will move by the influence of gravity upon said rotating turntable as it is being carried past said cutting means.

4. In a butter roll machine, a moving platform, a cutting means, a turntable mounted upon said moving platform and adapted to be carried thereby beneath a portion of said cutting means, means for imparting a rotating movement to said turntable while it is being carried along by said moving platform, means for feeding a sheet of dough to said cutting means, said cutting means being synchronized with the motion of said moving platform such that said cutting means will be operated to form a strip of dough the end of which will move by the influence of gravity upon said rotating turntable as it is being carried past said cutting means, and means for holding the end of said strip of dough upon said turntable.

5. In a butter roll machine a moving platform, a cutting means, a turntable mounted upon said moving platform and adapted to be carried thereby beneath a portion of said cutting means, means for imparting a rotating movement to said turntable while it is being carried along by said moving platform, means for feeding a sheet of dough to said cutting means, said cutting means being synchronized with the motion of said moving platform such that said cutting means will be operated to form a strip of dough the end of which will move by the influence of gravity upon said rotating turntable as it is being carried past said cutting means, and vacuum means for holding the end of said strip of dough upon said turntable.

6. In a butter roll machine, a turntable upon which the end of a strip of dough is adapted to be deposited for coiling into a Flemish coil, means for successively forming strips of dough, said means being positioned above said turntable, means for imparting a relative movement between said turntable and said dough strip forming means, said relative movement imparting means being synchronized with said dough strip forming means such that a strip of dough is formed so that the end thereof may be deposited upon the turntable by gravity each time said turntable and said dough strip forming means pass each other.

7. In a butter roll machine, a turntable upon which the end of a strip of dough is adapted to be deposited for coiling into a Flemish coil, means for successively forming strips of dough, said means being positioned above said turntable, means for imparting a relative movement between said turntable and said dough strip forming means, said relative movement imparting means being synchronized with said dough strip forming means such that a strip of dough is formed so that the end thereof may be deposited upon the turntable by gravity each time said turntable and said dough strip forming means pass each other, and means for holding the end of a strip of dough upon said turntable.

8. In a butter roll machine, a turntable upon which the end of a strip of dough is adapted to be deposited for coiling into a Flemish coil, means for successively forming strips of dough, said means being positioned above said turntable, means for imparting a relative movement between said turntable and said dough strip forming means, said relative movement imparting means being synchronized with said dough strip forming means such that a strip of dough is formed so that the end thereof may be deposited upon the turntable by gravity each time said turntable and said dough strip forming means pass each other, and vacuum means for holding the end of a strip of dough upon said turntable.

GLENN H. HOLLOWAY.